July 7, 1970 P. CHORNEY ET AL 3,519,964

HIGH POWER SLOW WAVE CIRCUIT

Filed July 26, 1968 2 Sheets-Sheet 1

INVENTORS.
*Paul Chorney*
*Marion E. Hines*
*Richard J. Madore*
BY
ATTORNEY

July 7, 1970 P. CHORNEY ET AL 3,519,964

HIGH POWER SLOW WAVE CIRCUIT

Filed July 26, 1968 2 Sheets-Sheet 2

INVENTORS
*Paul Chorney*
*Marion E. Hines*
*Richard J. Madore*
BY
ATTORNEY

1

3,519,964

HIGH POWER SLOW WAVE CIRCUIT

Paul Chorney, Norwood, Marion E. Hines, Weston, and Richard J. Madore, Peabody, Mass., assignors to Microwave Associates, Incorporated, Burlington, Mass., a corporation of Massachusetts Filed July 26, 1968, Ser. No. 747,973
Int. Cl. H03h *7/30;* H01j *25/36;* H03b *9/30*
U.S. Cl. 333—31 5 Claims

ABSTRACT OF THE DISCLOSURE

A slow wave circuit for a traveling wave tube is shown, employing a conductive helix secured within a helical ceramic or other insulator which may be continuous or segmented. The ceramic helix may be easily brazed to the conductor, and provides firm support mounted within a guide tube. This structure achieves an optimum combination of easy fabrication, low dispersion and high thermal dissipation. In certain situations, the improved results are further increased by permitting the use of materials which have more favorable characteristics, but which were previously mechanically unsuitable.

DRAWINGS

FIGS. 1*a*, 1*b* and 1*c* are illustrations of prior art.

BACKGROUND OF THE INVENTION

In the art of slow wave circuits for broad band traveling wave tubes, a slow wave normally is guided along a helix from one point to another synchronously with an electron beam. In so doing, it is desired to achieve optimum properties and characteristics of several factors which are, to a large extent, mutually inconsistent and mutually incompatible. It is sometimes desirable to amplify a broad band high frequency signal at relatively high power, and generally speaking it has been found that those slow wave circuits that operate at high power are limited to narrow bands, and those that can handle broad bands are limited to low power.

One of the problems which is unavoidable is that amplifying the high power signal results in a certain loss of power producing a great deal of heat which obviously must be dissipated and conducted away. Prior efforts to construct high power broad band slow wave circuits have failed to give adequate transmission characteristics with regard to dispersion, or have been inadequate with regard to thermal conductance. In addition, such efforts often have created very severe mechanical problems in the fabrication of the slow wave guides. Usually, all three problems have appeared simultaneously.

Figures 1A, 1B, 1C:
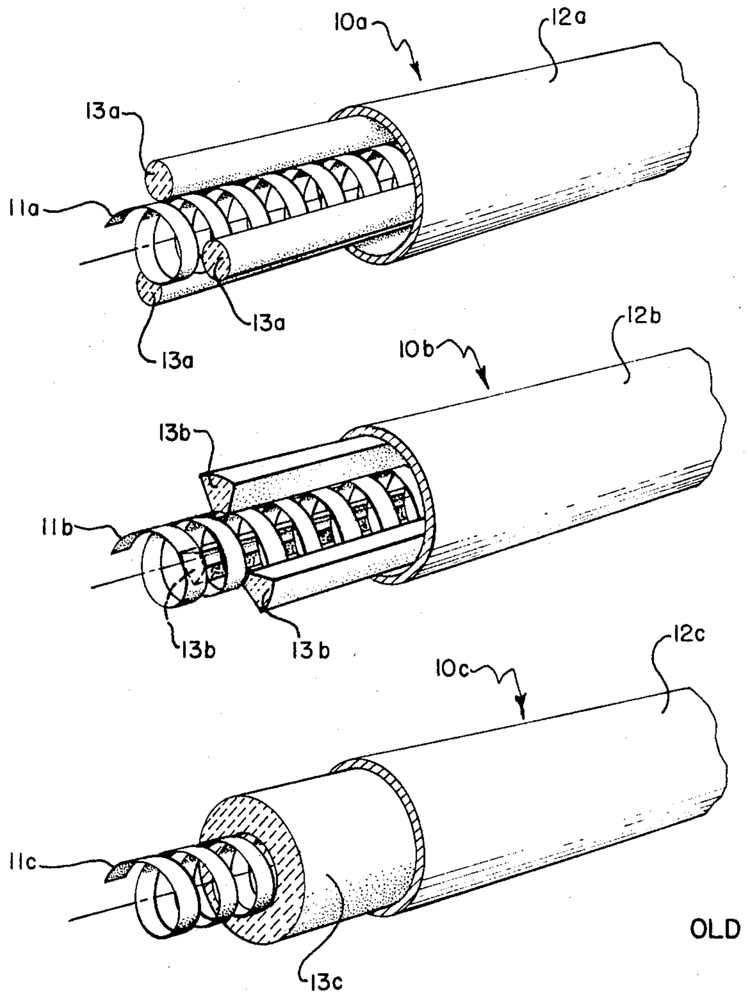

In FIG. 1*a* is illustrated a prior slow wave guide for a traveling wave tube, generally designated **10*a* comprising a helical conductor 11*a*, mounted within a cylindrical envelope 12*a* and supported therein by a plurality of ceramic rods 13*a*. The results achieved according to this prior art form include satisfactorily low dispersion, and thus acceptable transmission of the signal from one point to another along the helix 11**, haunted by extremely low thermal conductance. Because of the low thermal conductance, although acceptable for transmission of a relatively broad band slow wave, it is limited to relatively low power. The signal is, generally speaking, undistorted, but the structure

2 is completely inadequate for conductance of the heat which is produced under high power conditions.

In FIG. 1*b* is illustrated a second embodiment of a prior art slow wave circuit generally desingated **10*b*, including a helical conductor 11*b*, mounted in a cylindrical envelope 12*b* by means of rods 13*b* having a wedge-shaped cross section. The rods 13*b* in this embodiment are narrow, elongated segments in cylindrical form adapted to fit between the helix 11*b* and the envelope 12*b*, extending essentially the length of the helix. The support means 13*b* may, if desired, be brazed to the helix 11*b***. This embodiment of the prior art has limited usefulness because only fair dispersion results, and only fair thermal conductance is achieved; in effect, this is an unhappy compromise.

In FIG. 1*c* is illustrated a third embodiment of a prior art slow wave circuit generally designated **10*c*. In this embodiment, a helix 11*c* is supported within a cylindrical envelope 12*c* by means of a tubular ceramic member 13*c***. This embodiment of the prior art is useful to conduct or transmit a relatively high power signal. The thermal dissipation is excellent, but the device has very high dispersion, limiting it to a very narrow wave band. It is believed that this prior art embodiment has been constructed only experimentally.

SUMMARY OF THE INVENTION

Now in accordance with the present invention, it is possible to overcome several of the difficulties of the prior art, and to produce a slow wave circuit characterized by low dispersion and high thermal conductance, whereby a signal of a broad band of frequencies can be carried and amplified at high power, and to produce this result in a device having a great many mechanical advantages. In a preferred form of the invention, these mechanical advantages are so substantially improved that it is possible to use materials which had previously been ruled out by virtue of mechanical limitations, thus achieving multiplied improvement through the better performance of optimum materials.

Figure 2:
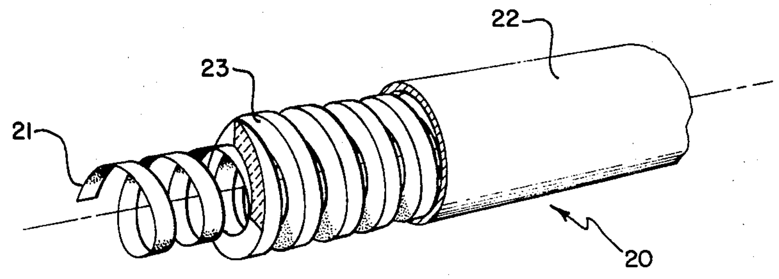
FIG. 2 is an isometric view of one embodiment of the invention.

The embodiments of the present invention are set forth in the figures. In FIG. 2 is illustrated one embodiment of a slow wave guide for a traveling wave tube generally designated 20, characterized by excellent thermal conductance which permits use and operation of the invention in conjunction with the high power transmission of slow waves. According to this embodiment, a helical conductor 21 is positioned in a cylindrical envelope 22, and is spaced therein by means of a ceramic helix 23. The conductor 21 is easily brazed to the ceramic helix 23.

Figure 3:
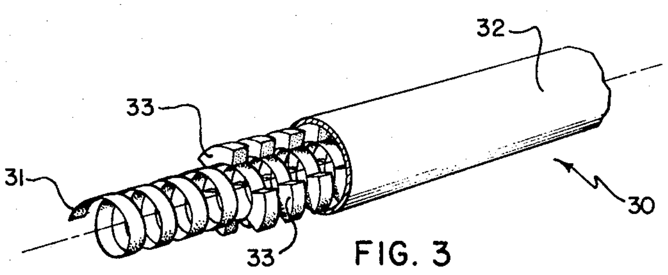
FIG. 3 is an isometric view of another embodiment of the invention.

In FIG. 3, there is illustrated a second embodiment of the present invention comprising a slow wave guide for a traveling wave tube generally designated 30 wherein a heilcal conductor 31 is mounted within a cylindrical envelope 32 by means of a segmented helical ceramic support member 33 consisting of a plurality of ceramic segments or wedges individually secured to the spiral conductor. Desirably, but not necessarily, the ceramic segments 33 may be secured to the conductor in an arrangement equivalent to longitudinal rows. These segments are secured to the conductor by suitable means, although a preferred method is to braze the ceramic material to the conductor; and by virtue of the open construction, complete brazing to both conductor and envelope is easily achieved. The length of individual contact between the individual ceramic members 33 and the helix 31 is relatively short to such an extent that the amount of thermal expansion within the operating range is held to a workable level.

In a preferred form of the present invention, the ceramic member 33 is a wedge support made of a material such as beryllium oxide. It is desirable to employ a material having a relatively low dielectric constant and possessing relatively high thermal conductivity. As is known in the art, beryllium oxide possess both of these characteristics to a high degree, and in addition, is easy to work with and is compatible with brazing and other procedures for securing the ceramic to the conductor. Aluminum oxide is also an easy material to work with, although its thermal conductivity is not so high. Boron nitride is an excellent material, although somewhat more difficult to secure to the conductive helix. Just about any insulating material can be used as the wedge support 33 provided it can be caused to adhere to the helix and has the proper thermal and electrical properties.

A very significant secondary advantage of this invention is that the traveling wave tube may be constructed with the usual refractory conductor helix as is customary in the art, but also in accordance with the present invention can be constructed of a superior metallic conductor such as copper. Because of the ability to use superior conductors, the surface resistivity of the traveling wave tube circuit is reduced, thereby reducing the amount of heat. Moreover, the tube can be operated at a lower temperature because of the decreased losses of power, which in turn reduces the resistivity of the conductor. Thus, it is apparent that the improved results cascade one upon another.

Figure 4:
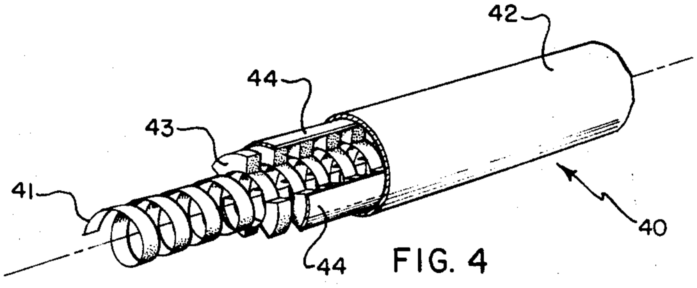
FIG. 4 is an isometric view of still another embodiment of the invention.

In FIG. 4, is illustrated a third embodiment of the invention comprising a slow wave guide for traveling wave tube generally designated 40, having a conductive metal helix 41, mounted with a cylindrical envelope 42 and supported therein by means of ceramic wedge-shaped supports 43 in a manner generally similar to the construction of the device in FIG. 3. In the present instance, the wedge members 43 are arranged in longitudinal rows, and a segmented support device 44 such as strips is secured to the outer surface of each such segmented row. The wedge-shaped members may be sections of a helix, or the helical shape may be approximated. Thus, there is within the envelope 42 a self-contained, structurally strong and sturdy core comprising the conductive helix 41, the wedge ceramic 43 and the segmented supports 44. This core can be brazed or otherwise secured into the envelope 42.

The embodiment illustrated in FIG. 4 retains the advantages of the embodiment in FIG. 3, including specifically its low dispersion, high thermal conductance and its excellent freedom of choice of construction materials.

In addition, this embodiment lends itself well to the introduction of an attenuation material. For example, a pattern of a material such as powdered graphite may be placed within the slow wave guide. Desirably, the pattern is gradual, as is well known in the art. Ceramic material containing an attenuation material is commercially available and may be used, if desired.

It will be understood that numerous modifications may be made without departing from the scope of the present invention, and that such modifications are within the skill of the art.

We claim.

1. A broad band, high power helical wave conductor for a traveling wave tube having electrically insulating helical spacer means secured in register to the outer surface of the helical conductor.

2. A broad band, high power slow wave guide for traveling wave tube comprising a helical conductor within a cylindrical envelope, electrically insulating helical spacer means secured in register to said helical conductor and to said envelope, supporting said helical conductor therein and making thermally conducting contact with both the helix and the envelope.

3. The conductor of claim 1, wherein the helical spacer comprises spaced segments secured in rows along the conductor.

4. The helical wave conductor of claim 3, wherein conductive metal strips longitudinally positioned along the length of the conductor are secured to the outer surfaces of said rows of helical spacer means.

5. A broad band, high power slow wave helical conductor for a traveling wave tube having electrically insulating spacer means located in a helical path which is in register with the conductor, said spacer means being secured to the outer surface of the conductor.

References Cited

UNITED STATES PATENTS 2,850,666 9/1958 Brewer ............. 315—3.5
2,879,436 3/1959 Geisler ........... 315—3.5 X HERMAN KARL SAALBACH, Primary Examiner M. NUSSBAUM, Assistant Examiner U.S. Cl. X.R.

315—3.5, 39.3

PO-1050
(5/69)

UNITED STATES PATENT OFFICE
CERTIFICATE OF CORRECTION

Patent No. 3,519,964 Dated July 7, 1970

Inventor(s) Paul Chorney, Marion E. Hines and Richard J. Madore

It is certified that error appears in the above-identified patent and that said Letters Patent are hereby corrected as shown below:

Column 2, line 41, delete "The embodiments" substitute -- Three embodiments -- .

SIGNED AND SEALED
DEC 29 1970

(SEAL)
Attest:

Edward M. Fletcher, Jr.
Attesting Officer

WILLIAM E. SCHUYLER, JR.
Commissioner of Patents